United States Patent [19]
Lents

[11] 4,153,736
[45] May 8, 1979

[54] METHOD FOR DISPLAYING AND MAINTAINING PRECOOKED FOOD IN A MOIST CONDITION AT A SUITABLE SERVING TEMPERATURE

[76] Inventor: Charles M. Lents, 9107 Dartbrook, Apt. 4, San Antonio, Tex. 78240

[21] Appl. No.: 813,954

[22] Filed: Jul. 8, 1977

[51] Int. Cl.$^2$ ............................................. A23L 1/01
[52] U.S. Cl. ..................................... 426/302; 426/520
[58] Field of Search ............... 426/231, 302, 520, 523; 99/339, 341, 345, 346, 427; 219/214, 388; 126/273 R

[56] References Cited

U.S. PATENT DOCUMENTS

| 772,997 | 10/1904 | Benford | 99/345 |
| 1,292,031 | 1/1919 | Parker | 99/345 |
| 1,638,452 | 8/1927 | Panajiotaros et al. | 99/345 |
| 1,786,300 | 12/1930 | Harrison | 99/341 |
| 2,785,624 | 3/1957 | Brittain | 99/346 |
| 2,885,951 | 5/1959 | Wolske | 99/346 |
| 3,504,620 | 4/1970 | Gerhardt | 99/427 |
| 3,648,010 | 3/1972 | Schier | 99/427 X |

*Primary Examiner*—Robert A. Yoncoskie

[57] ABSTRACT

A method for automatically maintaining pre-cooked food such as corn-on-the-cob in a moist condition and at serving temperature up to serving time, comprising a display cabinet with a food support means having a rotary carousel means for periodically dipping the food in a basting liquid and thereafter draining at a predetermined rate to maintain the food palatable and prevent degradation of the food caused by over basting.

5 Claims, 8 Drawing Figures

METHOD FOR DISPLAYING AND MAINTAINING PRECOOKED FOOD IN A MOIST CONDITION AT A SUITABLE SERVING TEMPERATURE

BACKGROUND OF THE INVENTION

This invention relates generally to a method for displaying and maintaining pre-cooked foods at a desired serving temperature in an attractive, aesthetically appealing display apparatus. More specifically, the invention is directed to a device for display and sales promotions of corn-on-the-cob which is kept at a desired serving temperature up to the time they are served or sold in restaurants, lunch rooms, drive-ins or similar establishments.

Heating devices and ovens for keeping precooked food items at a desired serving temperature up to service or sale are well-known in the prior art. Examples of some display or storage devices are found in U.S. Pat. Nos. 2,649,852, 3,327,092, 3,327,616, 3,632,968, 3,641,945 and 3,648,010. In particular, U.S. Pat. No. 2,649,852 disclosed a rotating hot dog display apparatus which dips the hot dogs in a barbecue flavor sauce as it rotates. Also, U.S. Pat. No. 3,648,010 discloses a rotary food support in a food display device.

As far as known, prior art devices have suffered from disadvantages which may prevent their utilization as combination warming and display devices when it is desired to keep the displayed items warm and moist. One disadvantage with some devices is that radiant heat or warm air are the only warming mediums used to warm the displayed items. This may dry out the displayed items making them unmerchantable or requiring removal of the items to avoid completely drying them out if they are not quickly sold. These devices may also limit the items that can be displayed. Some devices simply do not provide a method for heating and moisturizing the displayed items. Some devices may provide that the food item be kept moist by maintaining it substantially submerged in a basting liquid or by subjecting it to steam. Extensive submersion may result in undesirable sogginess and steam may overcook a food item damaging its flavor. In either case, the food item may no longer be merchantable resulting in a loss of sale and waste of food. The amount and manner of contact with a basting liquid may be critical in preserving a precooked food item over a period of time until it is sold. The regulation of the contact is necessary to achieve desired results.

A pre-cooked food display should also be aesthetically appealing since this stimulates sales, particularly in a fast-food or carry-out restaurant. Sales may be increased by placing a pre-cooked food item where it can be readily viewed while maintaining it in a controlled atmosphere whereby the food item is maintained at a desired serving temperature and under other desired environmental conditions. Enclosed display cases having glass viewing panes have been known in the prior art to provide a sanitary enclosure with some regulation of the atmosphere within the case. When a basting liquid is used in a glass display case it is important that the basting liquid not be allowed to splash on the glass. In the case of lower viscosity basting liquids, the undesired splashing on the glass walls is more likely.

SUMMARY OF THE INVENTION

A new and improved food warming and display apparatus and method for basting a precooked food, particularly for corn-on-the-cob, having an enclosed display cabinet containing a rotary carousel assembly with food support trays that are positioned for viewing of the items on display by prospective customers. The environment of the apparatus is controlled and food support trays are periodically basted in a liquid to maintain the food item moist without leaching out flavor or over soaking the food item.

The carousel assembly is rotated by a self-contained motor assembly whereby each support tray is periodically submerged in a pan or container of basting liquid which may be water and butter located in a pan in the lower portion of the cabinet. A heating element keeps the pan at a desired temperature and also maintains the inside of the cabinet at an elevated temperature and maintains the food at serving temperature. The trays are normally maintained at a slanted position to drain off excess basting liquid after passing through the basting pan and are moved to a horizontal position upon engaging the bottom of the pan. The trays, with the typical corn-on-the-cob, are completely emersed in the pan of basting liquid and once moved out of the pan, again assume the slanted position so excess basting liquid drops back into the pan through a centrally positioned drain in each tray which central drain prevents splashing of the basting liquid on the glass walls of the cabinet. The periodic basting and draining keep the corn-on-the-cob warm and moist without leaching out too much flavoring or making it soggy. There is no rolling or moving of an ear of corn in the tray which avoids damage or bruising to the ears.

DETAILED DESCRIPTION OF THE PREFERRED EMBODIMENT

Figure 1:
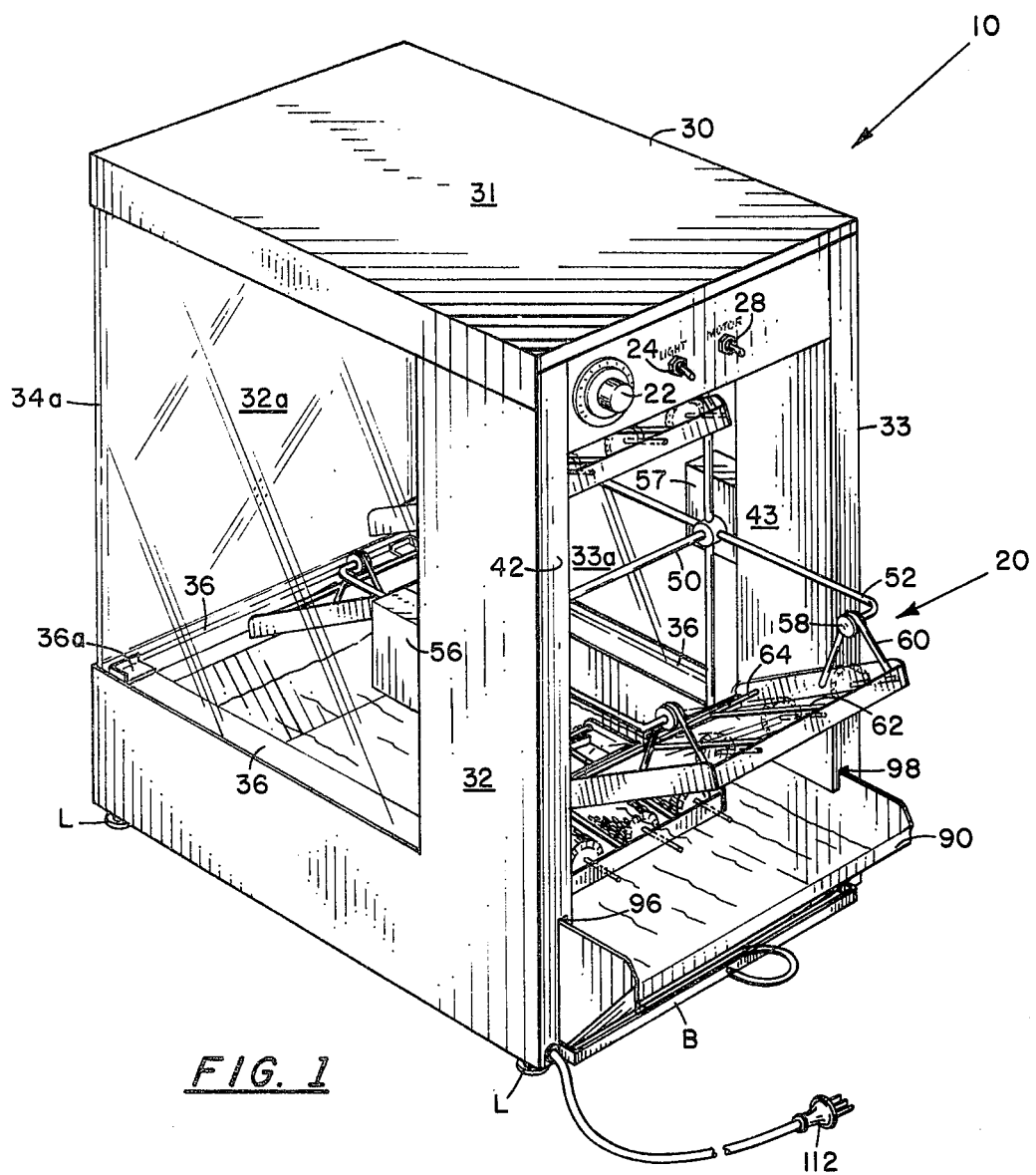
FIG. 1 is a perspective view of a display apparatus showing a preferred embodiment of this invention.

Turning now to the drawings, there is shown an apparatus in accordance with the invention. The apparatus, as shown in FIG. 1 is generally designated by the numeral 10. The apparatus 10 is shown having a tray-holding rotary carousel assembly 20 which is mounted in a cabinet 30. This cabinet 30 includes a top member 31, opposed display side walls 32 and 33, and front display wall 34, which defines a 3-sided enclosure. Clear glass panes 32a, 33a, 34a form a major portion of opposed sidewalls 32 and 33, and front wall 34. The glass panes at the lower edge are supported in a groove (not shown) formed by angle members 36 secured with the lower portions of opposed sidewalls 32 and 33, and front wall 34. The glass panes may be mounted in groove so they may be lifted or slid out for cleaning. Upper (not shown) and lower brackets 36a maintain the glass panes against members 36 and are also secured with hollow channel members 42 and 43 interior to opposed sidewalls 32 and 33. Adjustable leg supports L (two of which are shown) are mounted at the four corners of the cabinet to provide support and leveling of the cabinet on a countertop or the like. The cabinet walls and side may be formed of sheet metal such as stainless steel which is secured together by bolts, welding or the like.

Figure 5:
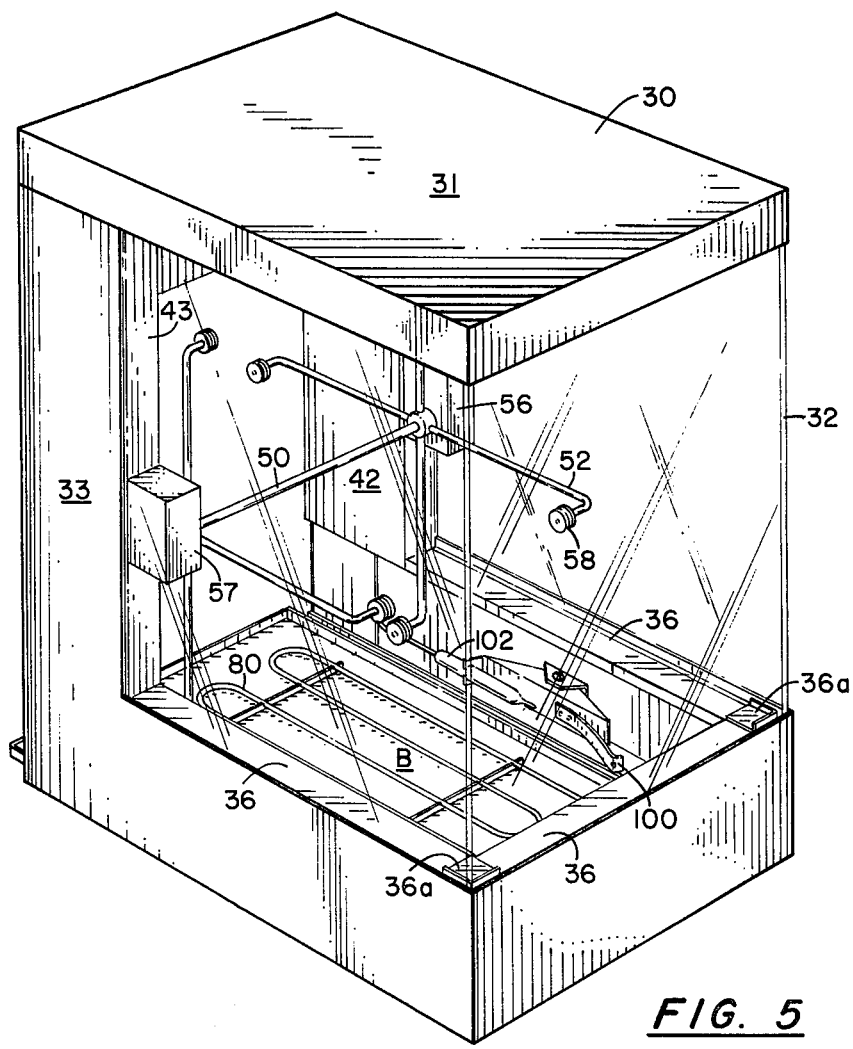
FIG. 5 is a front perspective view to show the heating element and rotary assembly of the display apparatus.

Referring now to FIGS. 1 and 5, a basting means or rotary carousel assembly 20 is mounted within the cabinet 30, and includes the following elements: a rotating axle 50; cylindrical, fingerlike tray supports 52; and trays 54 pivotally suspended on tray supports 52. Axle 50 is supported by opposing axle support bushings or blocks 56 and 57 which are secured to and extend from channel members 42 and 43. The tray supports 52 extend outwardly and perpendicular to axle 50 and at right angles to each other. The ends of tray supports 52 are bent inwardly at right angles to the tray support rods 52 and parallel to axle 50. The ends of tray supports 52 have rollers 58 to carry and aid in maintaining trays 54 in a slanted position as explained hereinafter. Although a ferris wheel type carousel is preferred, a continuous chain-type conveyor or the like might also be used to periodically dip the trays in the basting liquid.

Figure 2:
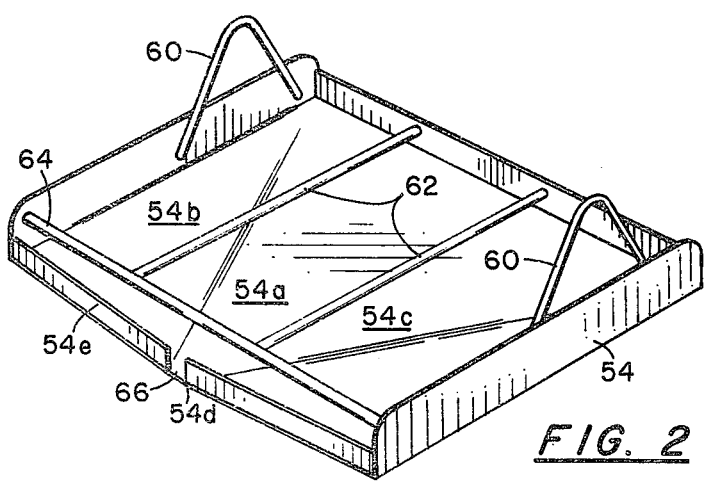
FIG. 2 is a perspective view of a food support tray.

Tray 54 is shown in FIG. 2 as having a slightly concave tray bottom formed by planar surfaces 54a, 54b and 54d with support hoops 60 located at the rear end of tray 54. This positioning of the support hoops 60 shifts the center of gravity of tray 54 toward the rear. This shift in the center of gravity allows tray 54 to maintain a tilted or slanted position when carried by rotary assembly 20. Two spaced longitudinal bars 62 and one horizontal bar 64 help to position and maintain items placed on tray 54. Drain opening 66 allows excess basting liquids to run off tray 54 without undue splatterings. The trays 54 are shown in their normal tilted position in FIG. 1.

Figure 7:
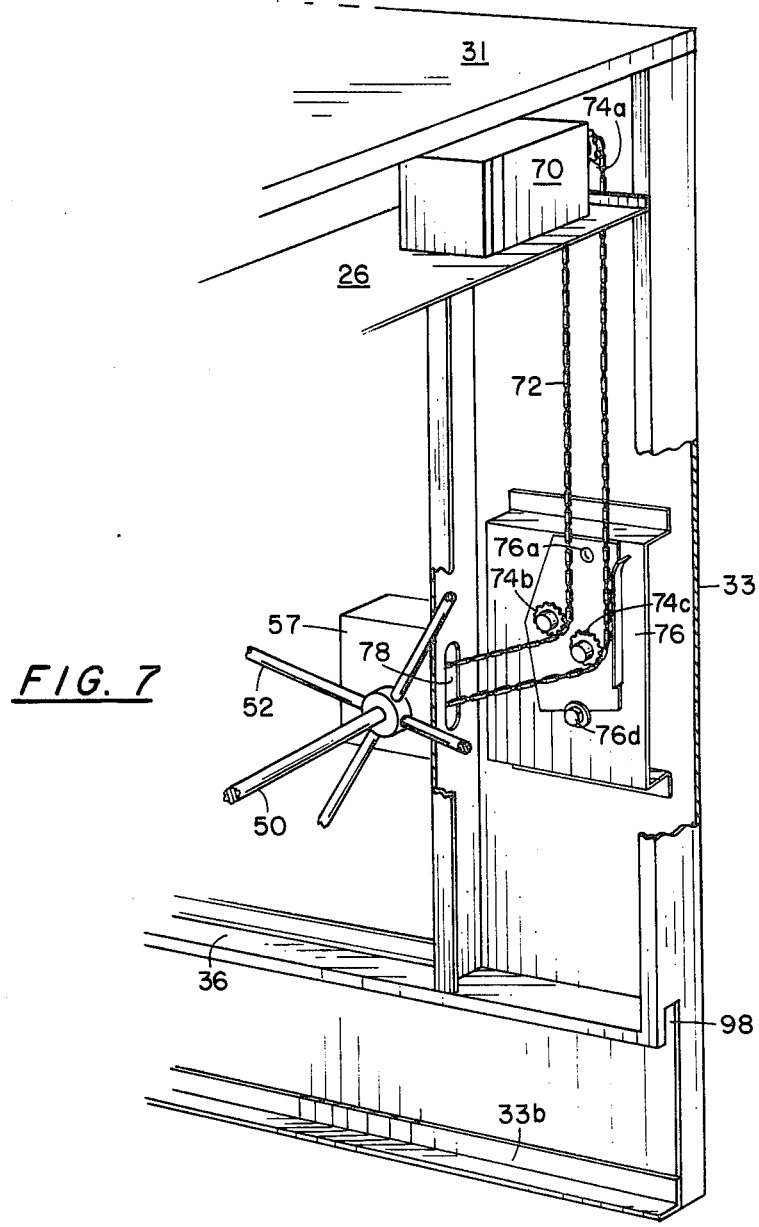
FIG. 7 is a perspective, cross-sectional side view partially broken away to show the motor and chain drive mechanism of the display apparatus.

Referring now more specifically to FIG. 7, there is shown the drive assembly which rotates rotary assembly 20. The drive assembly includes motor 70, chain 72, gears 74a, 74b and 74c and gear support 76. A gear (not shown) is mounted on the rotatable axle 50. Motor 70 is located on channel member 26 to position gear 74a in alignment with gears 74b and 74c located on adjustable gear support 76. Chain 72 is guided at an angle around gears 74 through opening 78 and around the gear axle 50. The entire drive assembly is located within channel 43, preventing contamination of the interior of cabinet 30 and out of sight of the customer's view. The gear support 76 is pivotally mounted on pivot 76a with washer and bolt assembly 76d preventing pivoting of the support. This pivotal mount provides adjustment for the chain 72.

Figure 3:
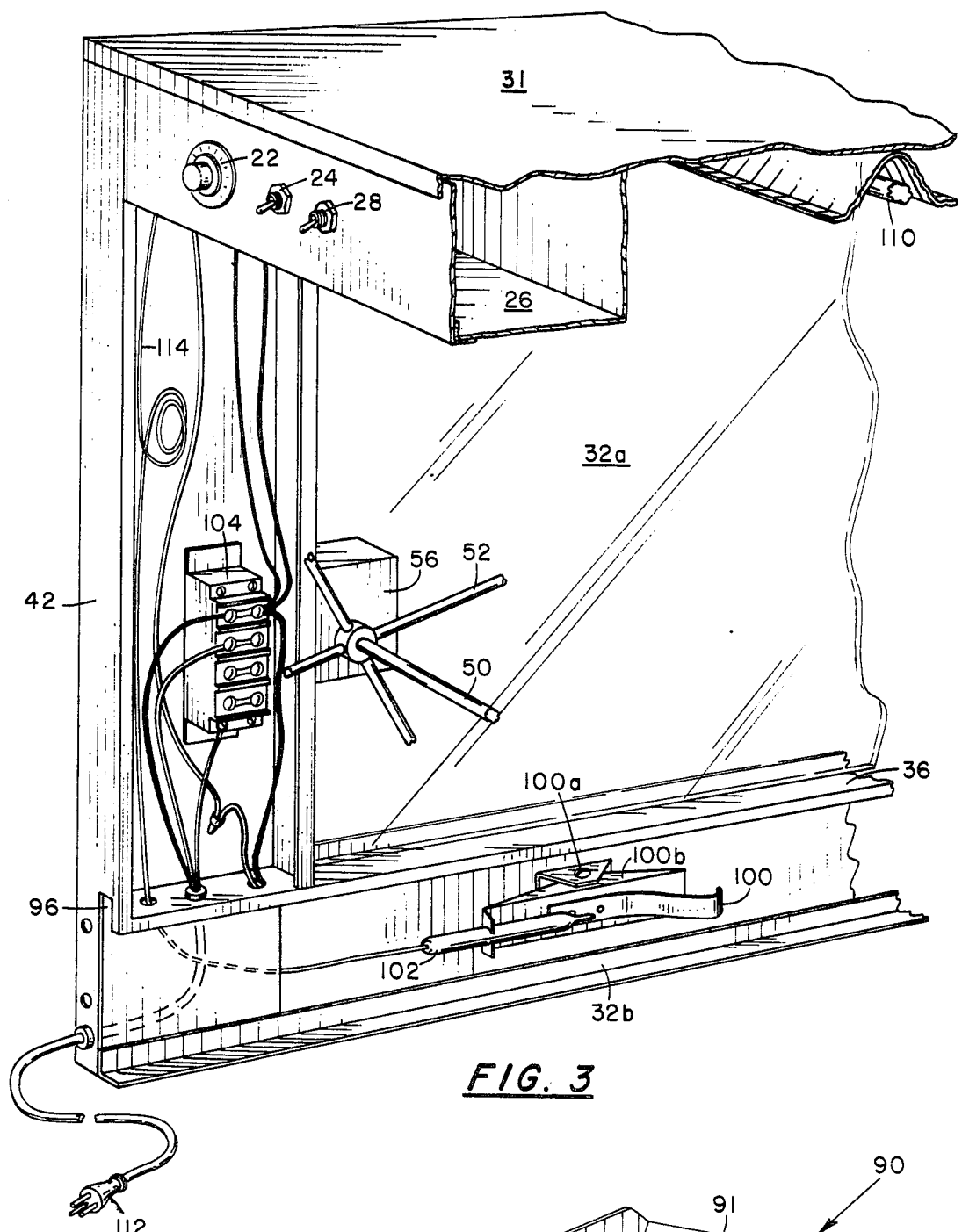
FIG. 3 is a perspective, cross-sectional side view partially broken away to show the electrical system and temperature control mechanism of the display apparatus.
Figure 4:
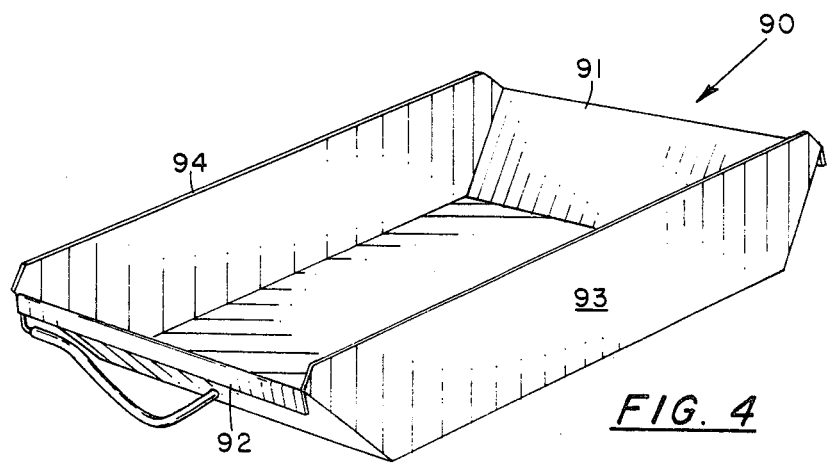
FIG. 4 is a perspective view of the basting pan.
Figure 6:
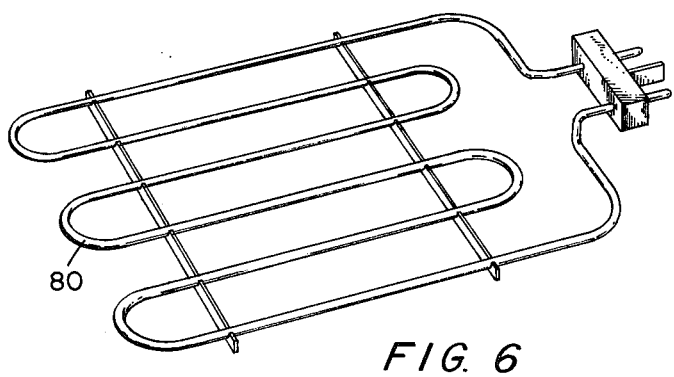
FIG. 6 is a perspective view of the heating element.

Referring now to FIGS. 4 and 6, there is shown pan 90 and heating element 80 which are both removable. Heating element 80 is located in the bottom of cabinet 30 as shown in FIG. 5 above lower base member B. Pan 90 slides into the bottom of cabinet 30 onto and directly above heating element 80. The heating element is supported by base member B which is supported by angle brackets 32b and 33b (FIGS. 3 and 7) secured to sidewalls 32 and 33. Pan 90 is constructed so opposing ends 91 and 92 slant outwardly to catch liquid droppings from trays 54 when rotary assembly 20 is in operation. Opposing sides 93 and 94 extend slightly higher on pan 90 and guide pan 90 into position through slots 96 and 98 located in opposed sidewalls 32 and 33.

Figure 8:
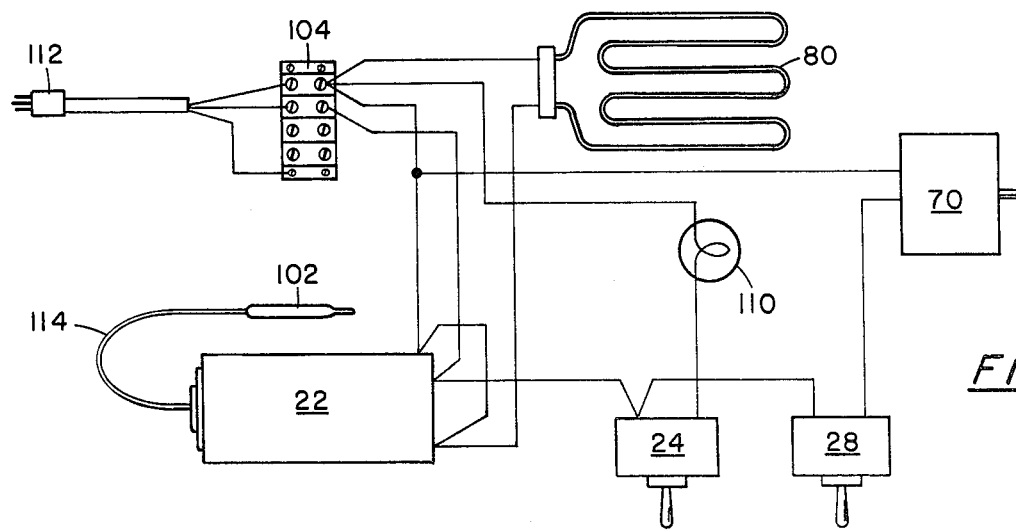
FIG. 8 is a schematic diagram illustrating the electrical components of the display apparatus.

The schematic circuit diagram of FIG. 8 illustrates typical electrical components of the invention. An adjustable thermostat 22 controls the temperature of the butter on pan 90 through sensor switch 102 which, in turn, controls heating element 80. Motor switch 28 controls motor 70 and light switch 24 controls a light 110. It will be observed that plug 112 provides the means for operating the appratus by a single electrical outlet. FIG. 3 shows the electrical components housed within channel member 42. Thermostat 22 is electrically connected to sensor 102 via wire 114. Sensor 102, in turn, is mounted with spring 100 which acts to maintain the sensor 90 in contact with the pan sidewall through pivot mount 100a for a pivoting sensor mount 100b. When pan 90 is in place, its sidewall is in direct contact with spring 100. The temperature of pan 90 is thus controlled by thermostat 22 via sensor 102. When the temperature of pan 90 reaches a predetermined value, the heating element 80 is automatically turned off by thermostat 22 via control relay 104 and automatically turned on again when the temperature of pan 90 drops below a lower predetermined value. The sensor switch contacts the side of pan 90 which also controls the heater element to shut it off if the pan 90 is removed.

OPERATION

The operation of the display device is described as follows. The pan 90 may be filled to a desired level with a basting liquid. The basting liquid may typically comprise water and butter and may include selected seasoning. One or more of the trays 54 may be removed to facilitate insertion of the pan 90. Alternatively, the pan 90 may be filled in its operating position shown in FIG. 1. The switch 24 may be turned on to energize the light 110 and hearing element 80. Also, the thermostat 22 may be adjusted to a desired setting. With the trays 54 in position as shown in FIG. 1, pre-cooked ears of corn are placed in the trays 54 and the switch 28 may be turned on to activate the motor 70 which rotates the carousel 20. As the carousel 20 rotates, it dips a tray 54 into the filled pan 90 to allow the basting liquid to enter the tray and contact the ears of corn therein. In the case of a water-butter basting liquid, some butter will remain on the ears to enhance their flavor. As each tray dips into the pan 90, the lower edge 54d of the tray engages the bottom of the pan to rotate the trays about rollers 58 to a horizontal position so that the basting liquid will uniformly fill the tray. The drain opening 66 also facilitates filling of the tray 54. The depth of the basting liquid is preferably such to provide substantially complete submersion of the ears of corn. As the carousel 20 continues to rotate, the pan 54 is lifted from the pan allowing the tray to assume its slanted position as shown in FIG. 1. The slanted or inclined position of the tray allows the basting liquid to drain from the tray through drain opening 66 so that the ears of corn are not oversoaked in the basting liquid. The concave bottom 54a also facilitates the desired drainage. The ears of corn in each tray are positioned in the pan 90 for a desired time depending on such factors as the speed of the motor 70 and gear ratios. The opening 66 and concave bottom 54a are sized to provide a desired drainage rate for each tray to provide optimum results. The central drain 66 is positioned away, remote from glass panes 32a, 33a and 34a to avoid splashing of the basting liquid on the panes. Also the counterclockwise rotation, as viewed in FIG.

1, places the drain opening far from the front pane 34a when the most amount of basting liquid is draining from a tray. The design of the trays 54 substantially eliminates splashing of the basting liquid on the glass panes which is important to maintain them sanitary and aesthetically pleasing.

Removal of ears of corn from the trays may be accomplished by turning switch 28 off which also allows refilling of trays 54. The thermostat 22 may be of a conventional adjustable type to control the temperature of the basting liquid.

The display cabinet, trays and pan may be made of suitable material such as stainless steel, aluminum, or the like to facilitate cleaning to provide necessary sanitary conditions.

The periodic dipping or emersion of the trays in the basting liquid provides the desired amount of basting to maintain ears of corn in the tray ready to serve without over-soaking the ears which may damage their flavor and texture. The design of the trays provides some regulation of the length of time that the basting liquid is maintained in contact with the ears of corn to provide adequate but not over basting. It is important that the basting be controlled so that the ears of corn receive the desired amount of basting within a predetermined range, which may be in part empirically determined. Mere dipping of the ears of corn may not provide sufficient basting or may allow splashing of the basting liquid on the glass panes of the display case, but the device of the present invention regulates the amount of basting and substantially eliminates undesired splashing. Also, no rolling or bruising of the ears of corn occurs because of the unique design of the trays which retain the ears in a stationary position in the trays. Although an on-off switch 28 is shown to control the motor 70, a variable-speed motor could be provided along with a variable-speed control switch so that the amount of basting may be further regulated.

The off center mounting of the hoops 60 maintains the trays 54 in the inclined position as the carousel rotates counter-clockwise as viewed in FIG. 1. Positioning of ears of corn on the trays also maintains the trays at an acute angle to the horizontal which provides substantially complete drainage of the tray. The drainage lip portion 54e of the tray is generally v-shaped to direct the basting liquid to the drain opening 66 so that the basting liquid is not trapped at the lower end of the tray (when the tray is not in the basting pan) which may cause over-soaking of a portion of each ear of corn.

While there has been shown and described a preferred embodiment of a combination warmer and display apparatus in accordance with the invention, it will be appreciated that many changes and modifications may be made therein without, however, departing from the essential spirit of the invention within the scope of the claims.

I claim:

1. A method for continuously maintaining pre-cooked food items in a moist condition at a suitable serving temperature, comprising the steps of:
   periodically immersing a pre-cooked food item contained in a basting tray in a heated basting pan containing a heated basting liquid;
   draining substantially all the basting liquid from the food and tray after the food and tray emerges from the basting liquid at a controlled rate sufficient to maintain the food item moist and to prevent sogginess of the food item and to avoid splashing of the draining basting liquid out of the basting pan.

2. The method as set forth in claim 1, comprising the step of:
   tilting a tray relative to the horizontal after emerging from the basting pan to drain substantially all of the basting liquid from the pan and the food item therein.

3. The method as set forth in claim 2, comprising the steps of:
   rotating a tray to a substantially horizontal position upon immersing in the basting pan to fill the tray and completely cover the food item.

4. The method as set forth in claim 3, comprising the step of:
   maintaining the basting tray and basting pan at a serving temperature in a glass walled display apparatus.

5. The method as set forth in claim 4, comprising the step of:
   draining the basting liquid at a controlled rate at a point remote from the walls of the glass display apparatus to avoid splashing of the basting liquid on the glass walls.

* * * * *